United States Patent Office 3,304,576
Patented Feb. 21, 1967

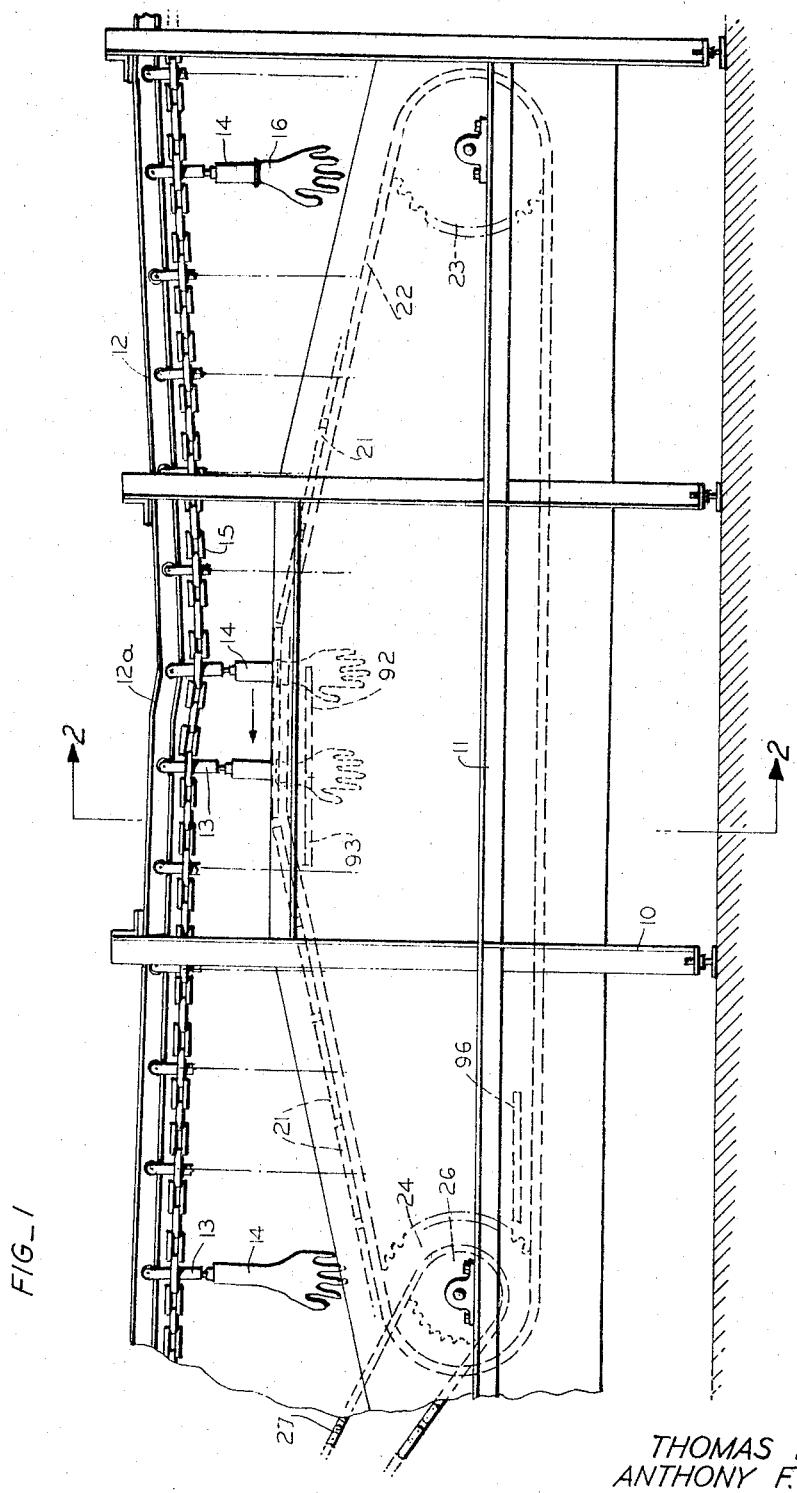

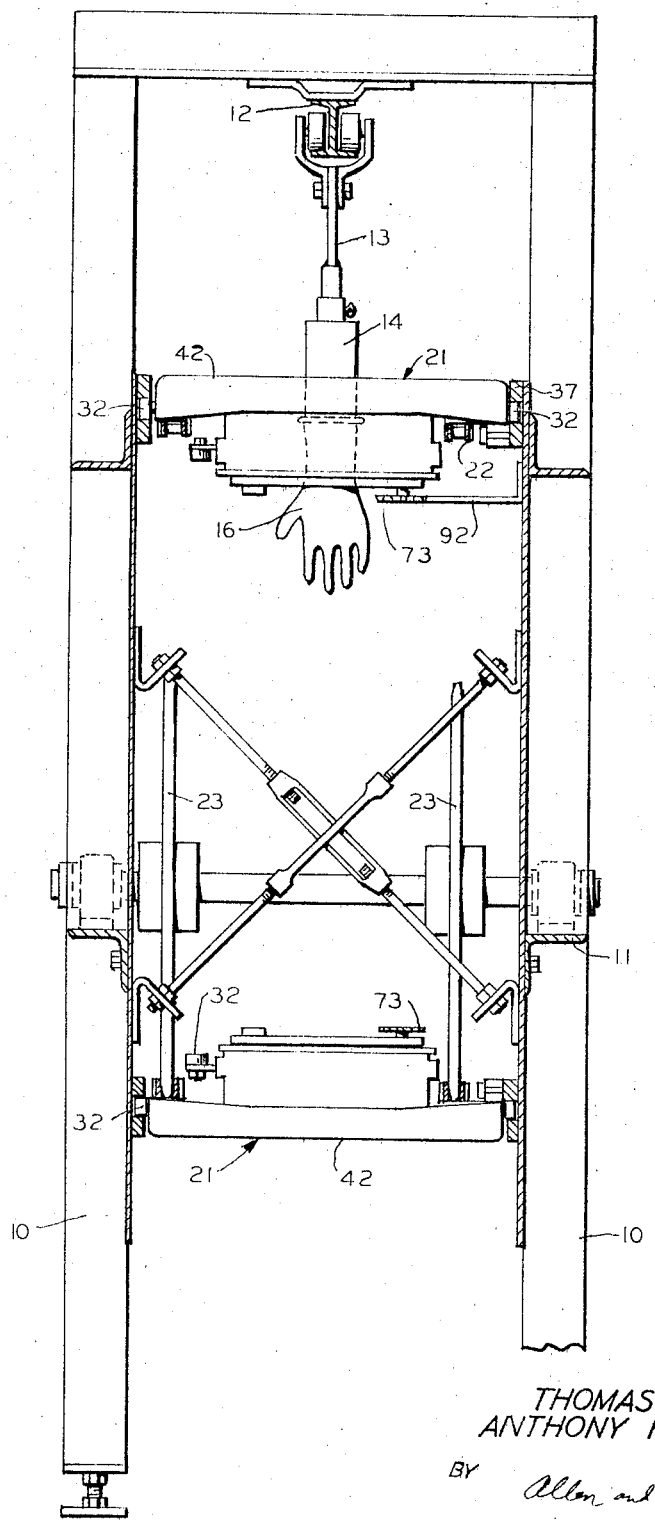
FIG_2

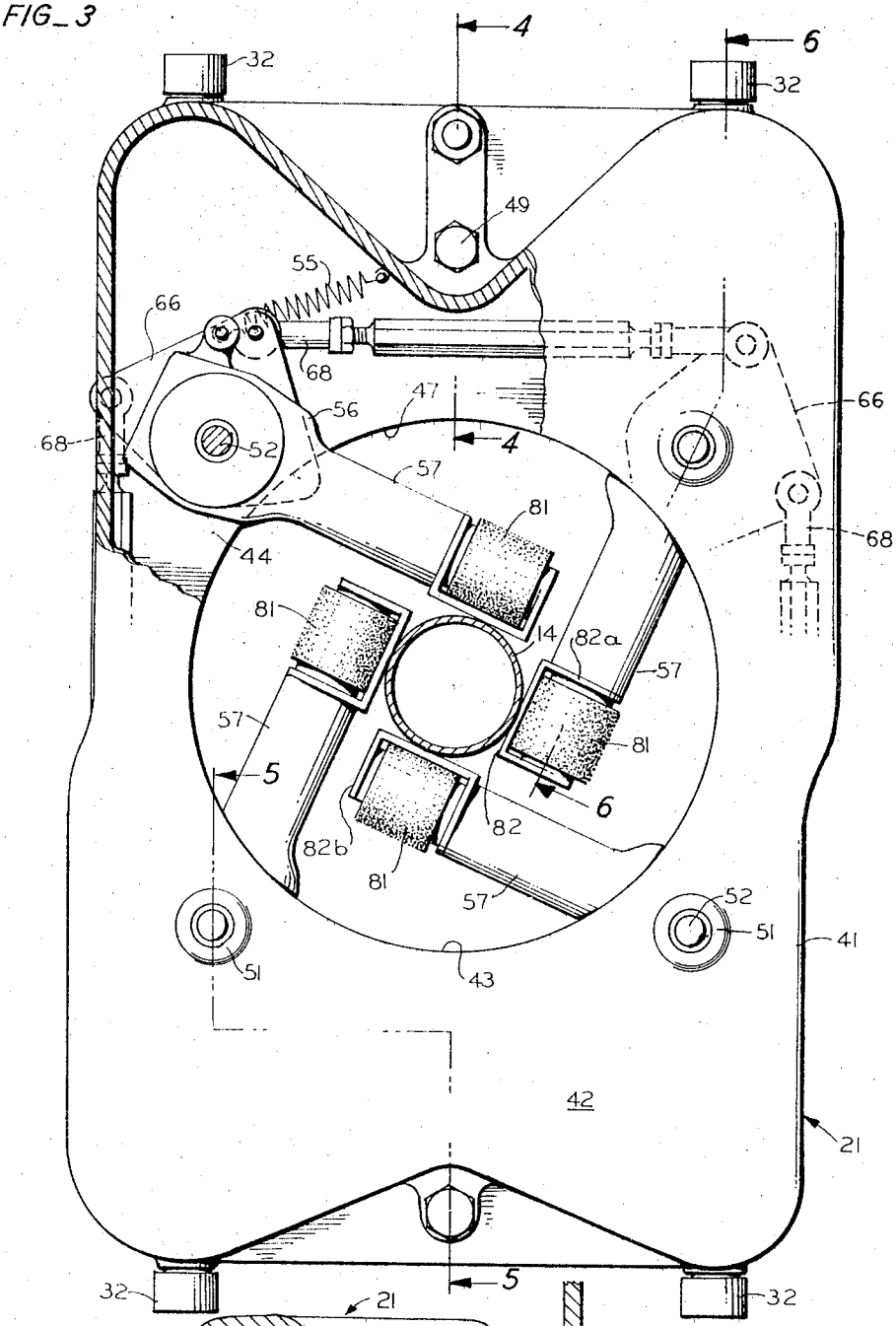
FIG_3
FIG_4
INVENTORS
THOMAS B. KEESLING
ANTHONY F. RODRIGUES
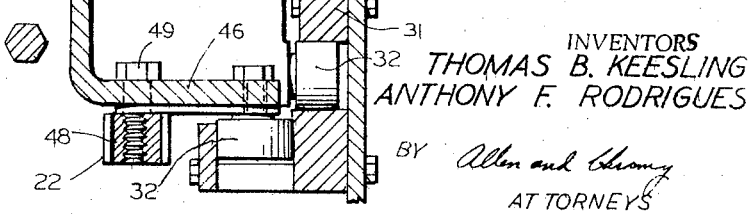
ATTORNEYS FIG_5
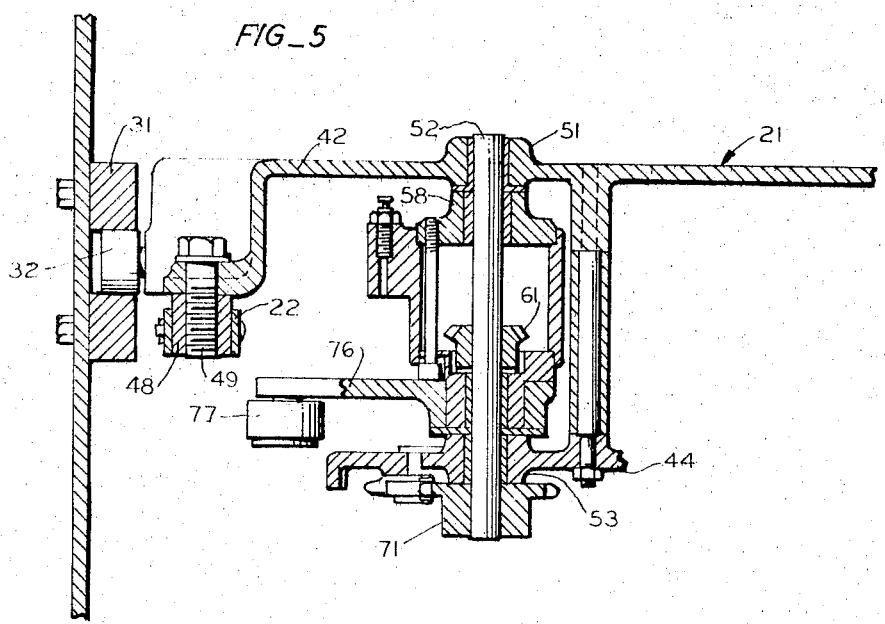
FIG_6
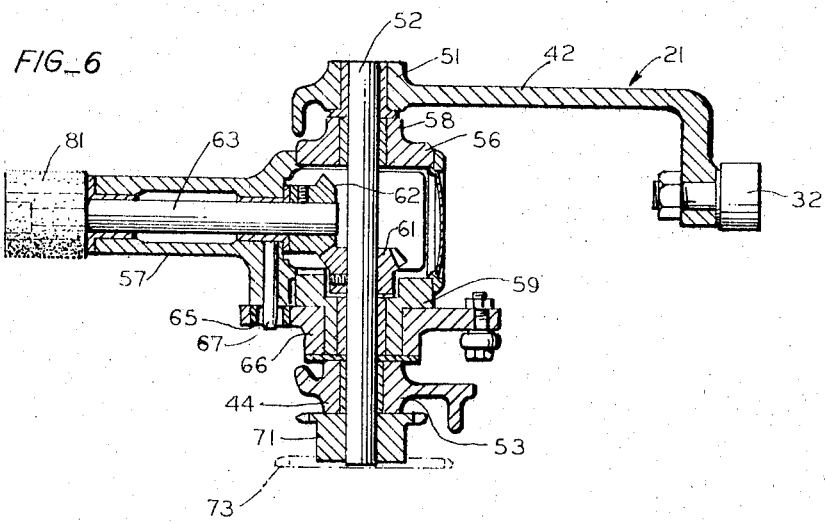

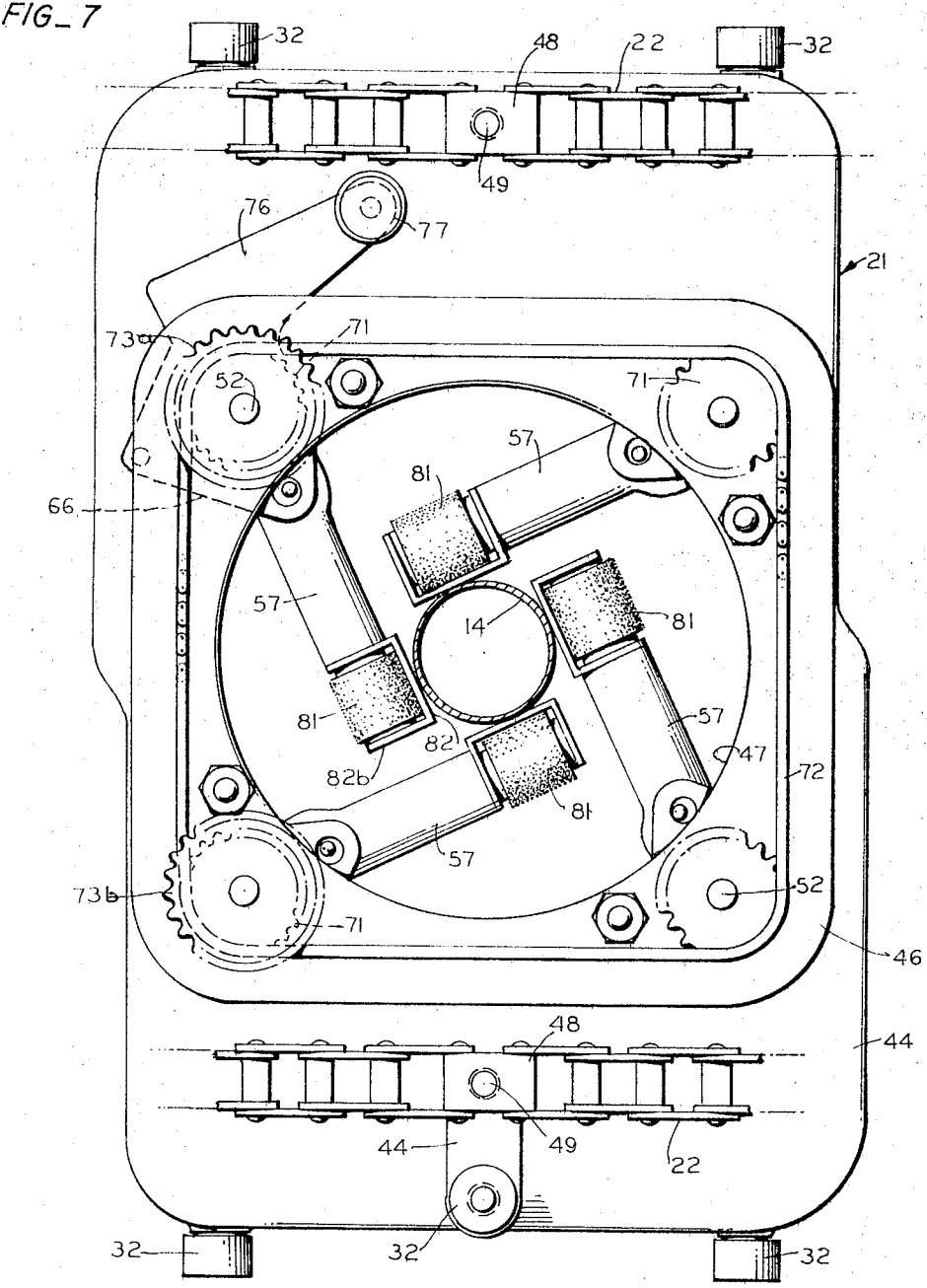

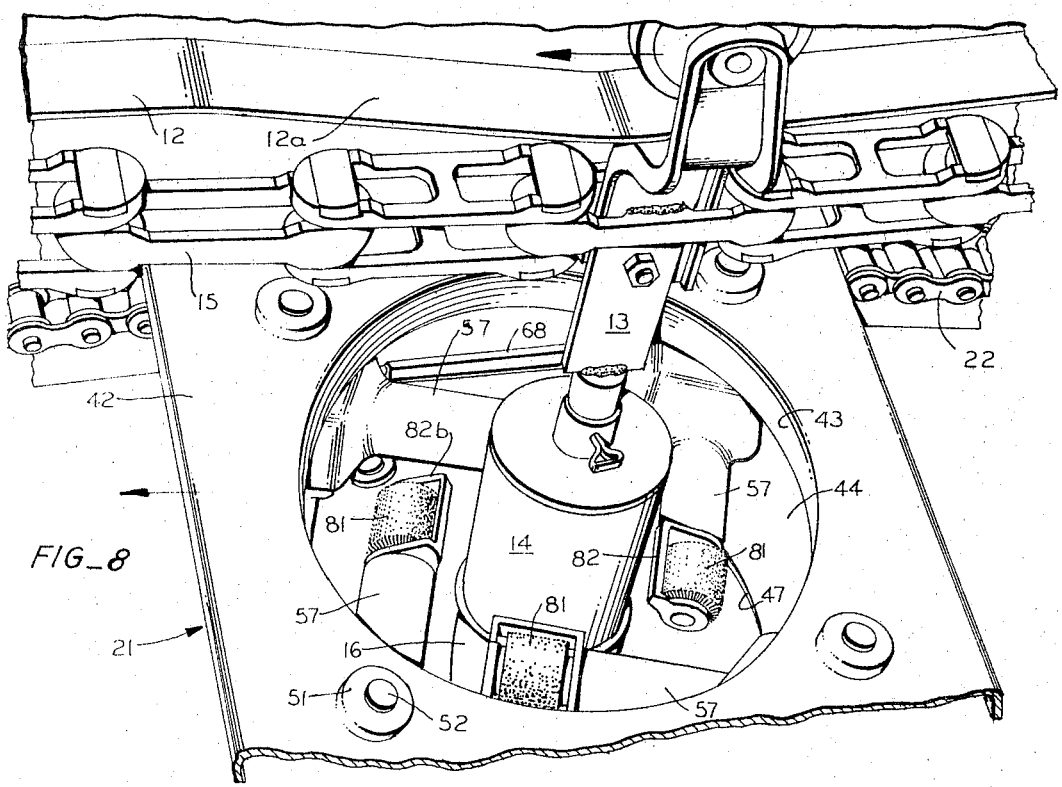
FIG_8
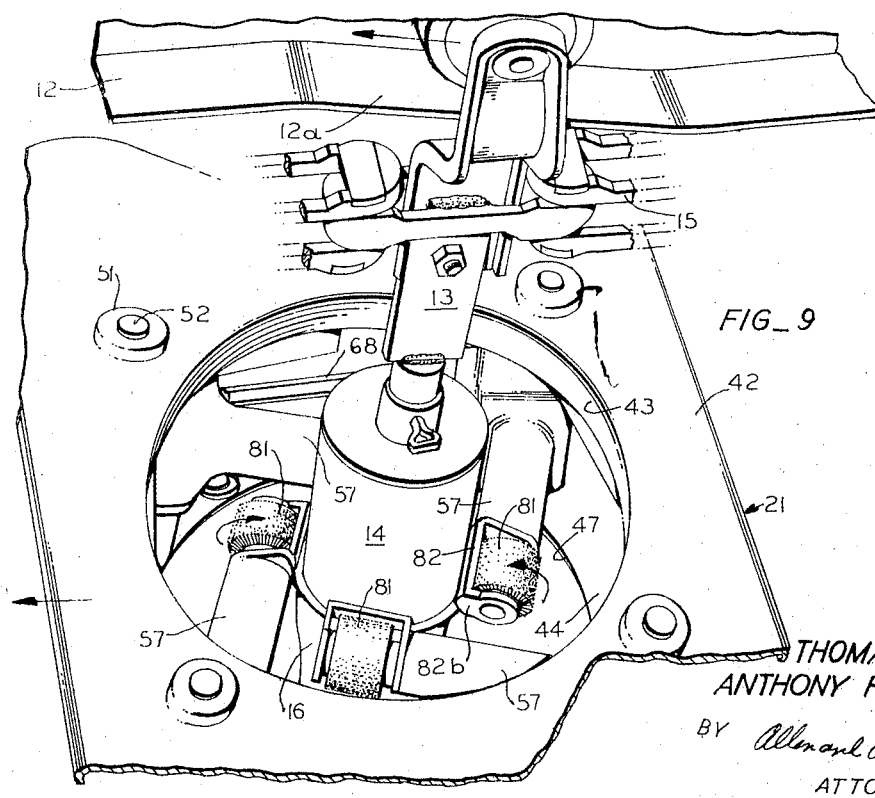
FIG_9
INVENTORS
THOMAS B. KEESLING
ANTHONY F. RODRIGUES
BY
ATTORNEYS Feb. 21, 1967  T. B. KEESLING ETAL  3,304,576
MANUFACTURE OF PLASTIC ARTICLES
Filed Jan. 24, 1964  10 Sheets-Sheet 7
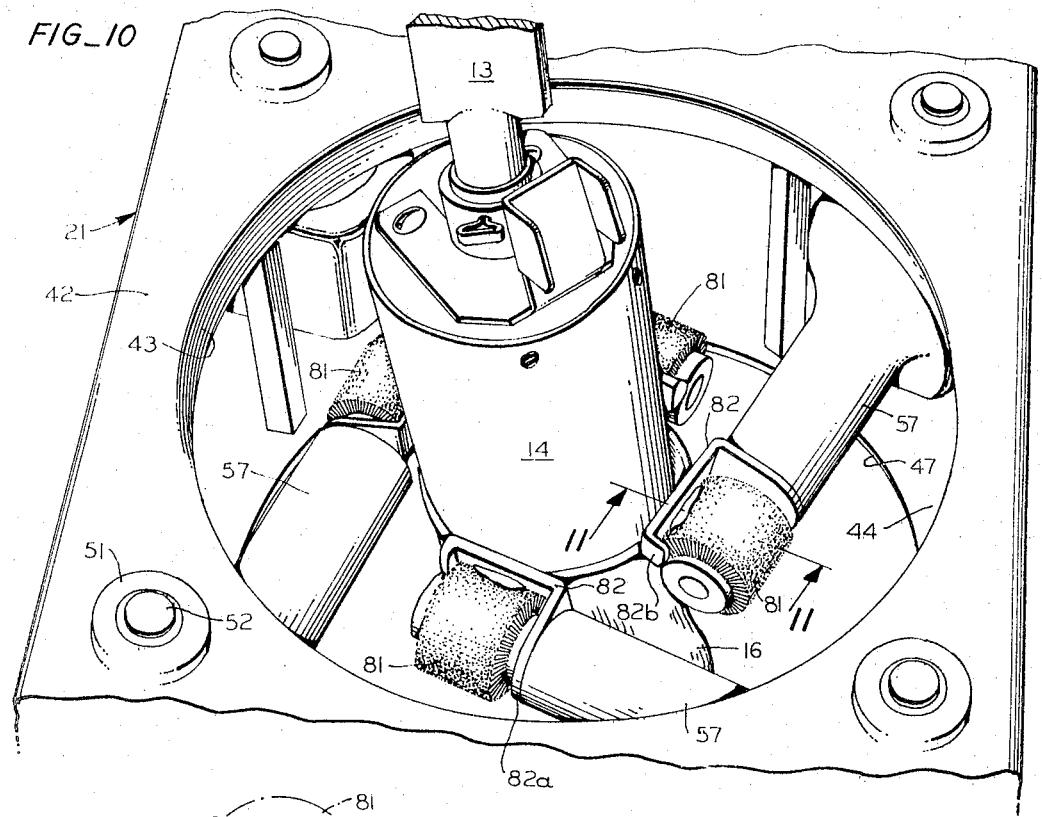
FIG_10
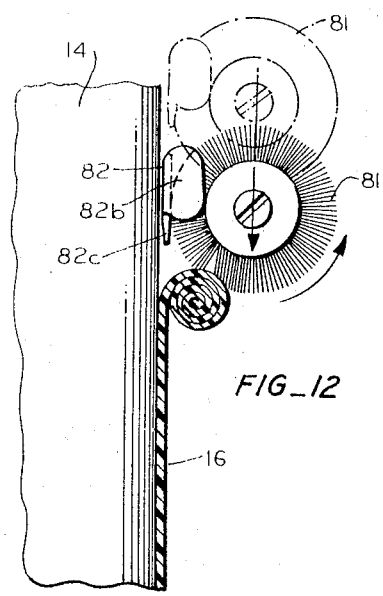
FIG_12
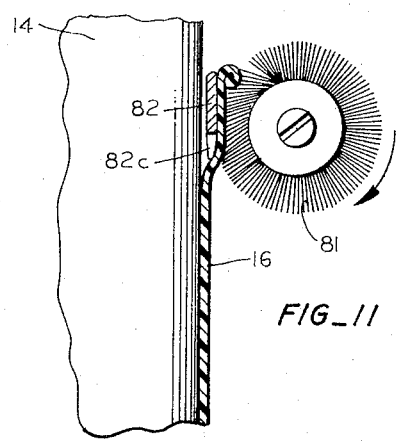
FIG_11
INVENTORS
THOMAS B. KEESLING
ANTHONY F. RODRIGUES
BY *Allen and Chromy*
ATTORNEYS

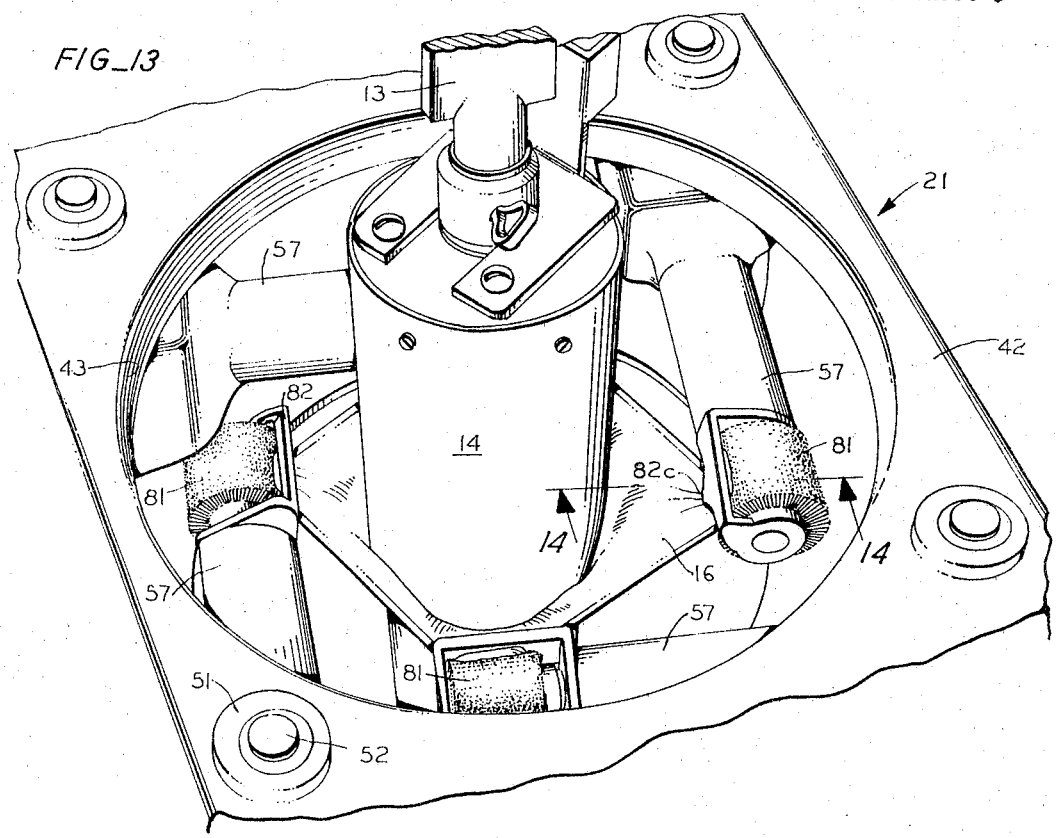
FIG_13
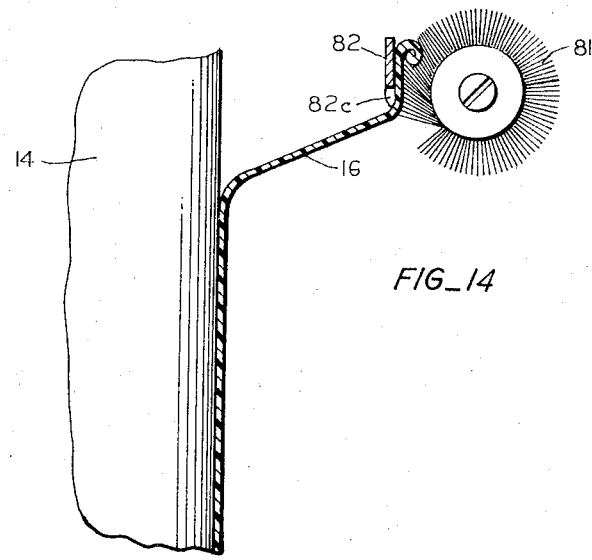
FIG_14
INVENTORS
THOMAS B. KEESLING
ANTHONY F. RODRIGUES
BY Allen and Chromy
ATTORNEYS Feb. 21, 1967  T. B. KEESLING ETAL  3,304,576
MANUFACTURE OF PLASTIC ARTICLES
Filed Jan. 24, 1964  10 Sheets-Sheet 9
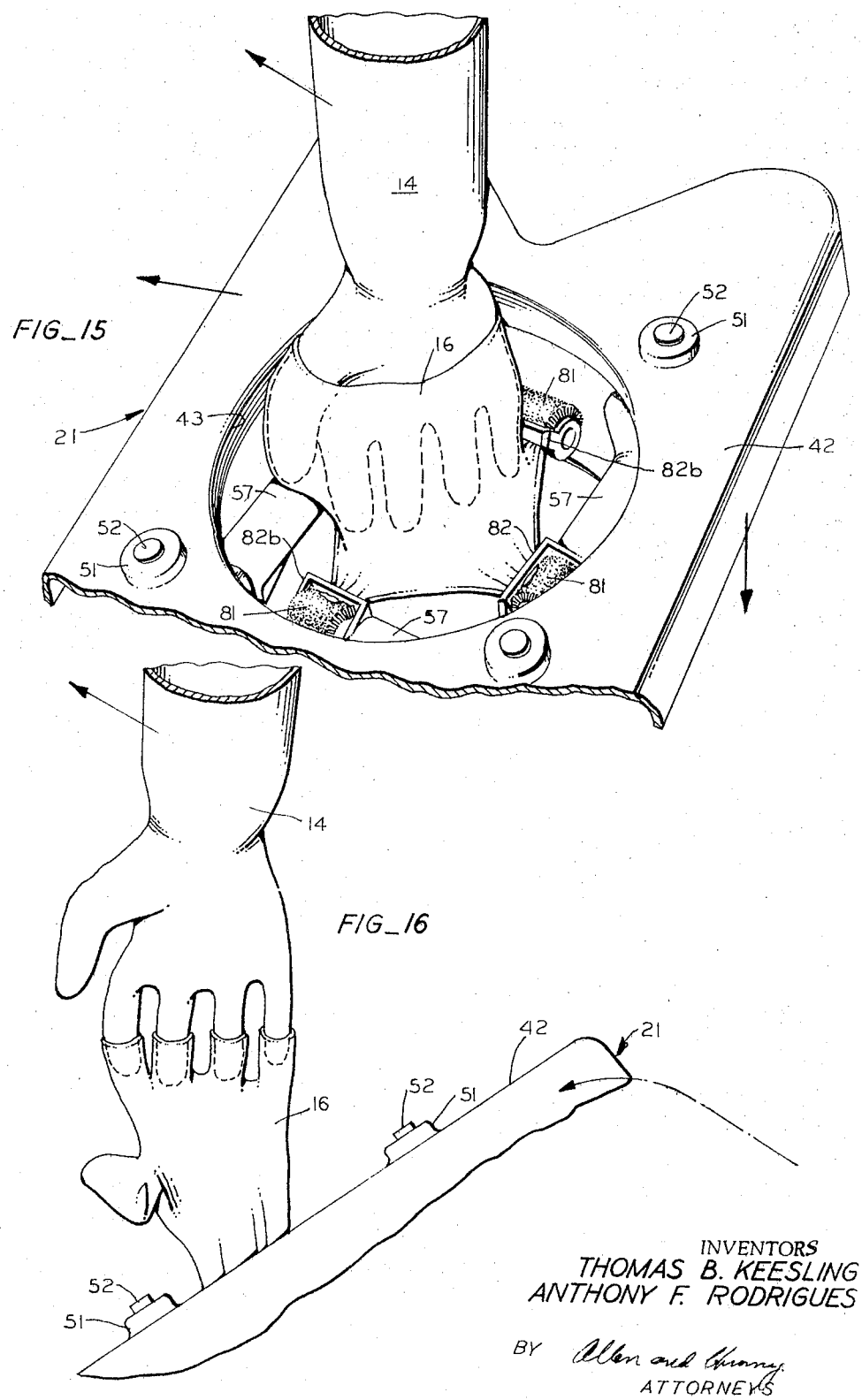
INVENTORS
THOMAS B. KEESLING
ANTHONY F. RODRIGUES
BY
ATTORNEYS

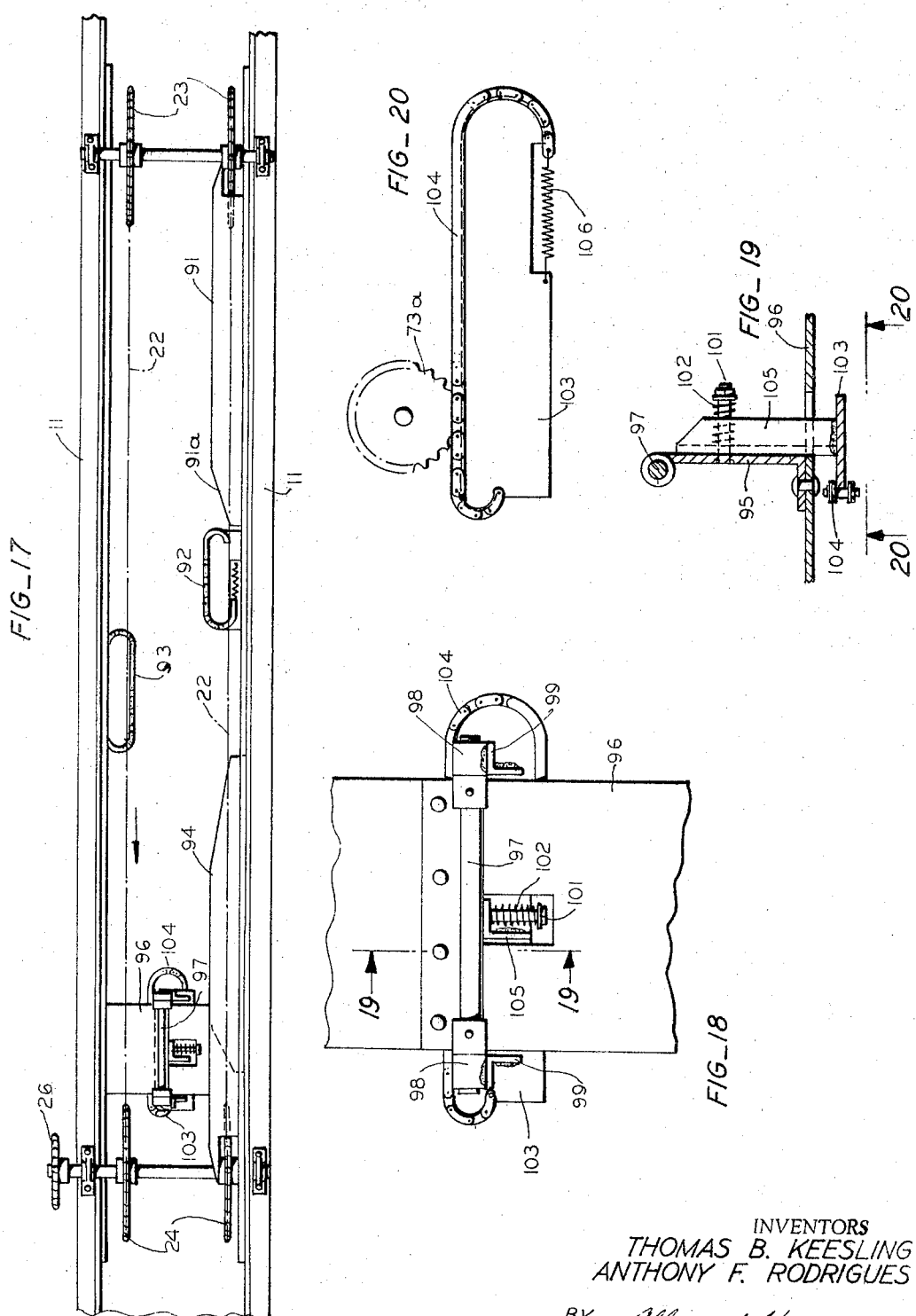

3,304,576
MANUFACTURE OF PLASTIC ARTICLES
Thomas B. Keesling and Anthony F. Rodrigues, Los Gatos, Calif., assignors, by mesne assignments, to Becton, Dickinson of California, Inc., Los Gatos, Calif., a corporation of California
Filed Jan. 24, 1964, Ser. No. 340,037
16 Claims. (Cl. 18—2)

The present invention relates to methods and apparatus for removing molded plastic articles from the molds on which they are formed and is concerned more particularly with improved methods and apparatus which operates in time with the molding apparatus to strip the articles from the mold so the molds can be returned for subsequent article forming operations.

It is the general object of the invention to provide improved methods and apparatus for removing molded articles from molds.

It is a further object of the invention to provide an apparatus for stripping a dip-molded article, such as a plastic glove or bag, from the mold form on which it is made.

Another object of the invention is to provide a stripping apparatus for strip-molded articles wherein advantage is taken of the construction of the article in the stripping operation.

Still another object of the invention is to provide improved stripping apparatus for dip-molded articles including improved means for handling the open end of the articles and for providing a firm but gentle grip on the articles to perform the stripping operation.

Other objects and advantages of the invention will be apparent from the following description of a preferred embodiment thereof, taken in connection with the accompanying drawings, in which:

FIG. 1 is a side elevational view of the stripping apparatus.

FIG. 2 is a transverse sectional view taken in a plane indicated by the line 2—2 in FIG. 1.

FIG. 3 is a plan view of one of the stripping units, with certain portions shown in section to illustrate details of construction.

FIG. 4 is a fragmentary sectional view taken in a plane indicated by the line 4—4 in FIG. 3.

FIG. 5 is a fragmentary sectional view taken in a plane indicated by the line 5—5 in FIG. 3.

FIG. 6 is another fragmentary sectional view taken in a plane indicated by the line 6—6 in FIG. 3.

FIG. 7 is a bottom plan view of one of the stripping units.

FIG. 8 is a perspective view of one of the stripping units showing a mold form as it is lowered between the open or disengaged stripping elements.

FIG. 9 is a view similar to FIG. 8 but showing the parts at a subsequent time in the movement of the form and the stripping head when the form has been raised and the stripping elements in the stripping unit have been allowed to engage the bare cylindrical portion of the form or mold.

FIG. 10 is a perspective view of a fragment of the center portion of one of the stripping units showing a mold form with the article thereon engaged by the stripping elements.

FIG. 11 is a fragmentary enlarged sectional view taken in a plane indicated by the line 11—11 in FIG. 10.

FIG. 12 is a fragmentary sectional view similar to FIG. 11 but showing the parts at a prior stage of the stripping operation.

FIG. 13 is a fragmentary perspective view of one of the stripping units with the mold and the article engaged therewith showing the mold stripping elements in a further stage of the stripping operation not illustrated in FIG. 10.

FIG. 14 is a fragmentary sectional view taken in a plane indicated by the line 14—14 in FIG. 13.

FIG. 15 is a perspective view of a mold with respect to the stripping unit showing the glove partially stripped therefrom.

FIG. 16 is a view similar to FIG. 15 but showing the final phases of the stripping operation.

FIG. 17 is a schematic view showing the frame of the stripping apparatus and certain components thereof.

FIG. 18 is a bottom plan view of one of the drive elements for the stripping apparatus.

FIG. 19 is a fragmentary sectional view taken on the line 19—19 in FIG. 18.

FIG. 20 is a fragmentary plan view taken in a plane as shown by the line 20—20 in FIG. 19.

Referring to FIG. 1 there is illustrated apparatus embodying the present invention and capable of carrying out the method of the present invention and such apparatus includes a frame 10 including transverse horizontal frame members 11 to which is secured a track 12. The track 12 supports a conveyor chain 15 and a plurality of roller-supported mold carriers 13 having molds 14 depending therefrom. Each of the molds 14 has a rigid connection to one of the links of the chain 15 and carrying thereon a molded article, such as a glove 16.

The frame 10 also supports a stripper conveyor including an endless series of stripper members or elements 21, which are carried by respective endless chains 22 trained about idler sprockets 23 and driving sprockets 24 suitably journalled on the frame. The shaft of the driving sprocket 24 also carries a sprocket 26 which is connected to a chain 27 driven in synchronism with the mold carrier chain 15. In this way there will be one of the stripping units 21 for each of the molds 14 or forms 14 along the coinciding portions of their paths of travel. The path of the mold carriers 14, as it leaves the idler sprocket 23 is inclined upwardly as guided by a pair of opposite tracks 31, FIGS. 1 and 2, in which respective pairs of rollers 32 at the sides of each of the stripping units 21 travel. This cam track 31 controls the motion of a stripping unit during its travel along the upper stretch of the chains 22 from the idler sprockets 23 to the driving sprockets 24.

Each stripping unit, or head 21, comprises a cast frame 41 (FIGS. 3 through 7) having a top wall 42 with a central opening 43 of circular outline and a bottom casting 44 having an opening 47 of circular outline which is in alignment with the opening 43 of the upper wall 42. Terms "upper" and "lower" are used in the sense of the travel of the stripping units along the upper stretch of their travel when they are active in the stripping operation. As seen in FIGS. 4 and 7, the conveying chains 22 are attached to the lower wall 46 of each stripping unit by means of a threaded block-type link 48 and a cap screw 49.

The upper wall 42 of each stripping head is provided with four bosses 51 (FIGS. 3 and 6) symmetrically disposed about the opening 43 and in which bearings are mounted for respective vertical shafts 52 rotatably carried in upper boss 51 and also in a boss 53 of the lower casting 44. Each of the vertical shafts 52 has pivotally mounted thereon intermediate the bosses 51 and 53 a hollow hub 56 (FIGS. 3, 5 and 6) of a stripping arm 57. The upper boss 58 of the hub 56 and the lower boss 59 of this hub have suitable bushing therein providing the pivoted mounting on the shaft 52. Within the lower boss 59 there is secured to the shaft 52 a bevel pinion 61 which meshes with a bevel pinion 62 secured to a shaft 63 suitably journaled in the stripping arm 57 and carrying at its outer end a stripping assembly referred to hereinafter.

Means is provided for providing the stripping arms with a common actuating connection to control their closing and opening movement with respect to a mold positioned in engagement therewith for stripping. Preferably, this common actuating connection has lost motion in its control connection to each of the arms so that it is in control when the arms are moved to open position with respect to a mold but, in the closed condition, the arms 57 are free to move sufficiently with respect to the operating connection to adjust themselves to an out-of-round condition of the mold itself.

The lower boss 59 (FIG. 6) of each stripping arm 57 has a machined seat to movably receive a plate 66, and each of these plates 66 has a lost motion connection with the adjacent arm 57 by means of pin 67 which fits loosely within a bushing 65 in the plate 66. In the embodiment shown, the amount of lost motion provided to the pin 67 allows about one-half inch of independent movement of the arm 57 with respect to a mold.

The plate 66 is apertured to receive respective pivot links 68, each of which serves as a tie between each adjacent pair of adjacent stripper arm assemblies so that these are connected to pivot together about their respective pivot shafts 52.

Also, each of the arms 57 has secured to its hub 56 a spring 55 urging the arm in a clockwise direction as viewed in FIG. 3 so that all the arms are urged inwardly with respect to the opening 43–47 and a mold positioned therein.

As seen in FIGS. 5 and 7, one of the triangular control plates 66 is formed with an extending arm 76, having a depending roller 77 for actuation by cam means as the stripping unit travels along in a manner later described.

Means is also provided for rotating the shafts 52 simultaneously in either direction. Adjacent its lower end each shaft 52 also carries a sprocket 71 (FIGS. 5, 6, and 7), and these sprockets are connected by a chain 72 to provide a common drive connection for the shaft 52 of the various stripper arms. Two of the shafts 52 as seen in FIGS. 5 and 7 carry larger sprockets 73 for movement or adjustment of the various stripping arms as later described.

Each of the stripping arms 57 has means at its free end for engagement with a mold and with the article thereon to perform gripping and control operations in connection with the stripping operation, including the forming of an enlarged roll at the open end of the article, and the unrolling of this roll into engagement with two cooperating elements which thereafter act as a pair of gripping means to grip the open end of the article during its movement away from and stripping from the mold. Each of the stripping arms 57 (FIGS. 3, 5, 10, 11 and 12) has secured at the reduced end of its shaft 63 a rotary brush 81, which acts as an article moving means and gripping means. The brush 81 is embraced on its inner face by a channel-shaped cooperating article gripping element in the form of a spade 82, which has one flange 82a secured to the end of the arm 57 and a second flange 82b embracing the opposite end of the brush 81. As seen in FIG. 12, the middle lower end of the spade is tapered at 82c to provide an entry or portion for the gripping element to enter between the mold and the plastic article formed thereon in a manner later described.

Means are provided on the frame to open the four stripper arms to an inactive position to receive a mold with a glove thereon as they are beginning the ascending portion of the upper stretch of their travel and this means takes the form of a cam 91 (FIG. 17) which engages the roller 77 and through the arm 76 moves the gripping arms 57 outwardly. As seen in FIG. 8 where the stripping heads and their gripping means at the end of the arms 57 are in their extreme open position permitting the passage of a glove mold down therethrough as the stripping head is being elevated. As the stripping head is passing the position where the roller 77 moves down the end 91a of the cam 91, the spades 82 and the brush 81 are moved into active position to engage a mold as seen in FIGS. 3 and 7. Thereafter the sprocket 73a engages a short length of fixed chain 92 to rotate the brushes in a counter-clockwise direction as viewed in FIG. 12, and this rotation occurs while the particular mold and glove are moving up an inclined portion 12a (FIG. 9) of the supporting track 12 so that they are moving upwardly with respect to the stripping head. This action is effective to cause a rolling of a cuff portion of the glove, for example (or the bead portion of the open mouth of a bag) downwardly over itself as seen in FIG. 12. Subsequently the roller 73b at the opposite side of the head engages a second fixed length of chain 93 (FIG. 17) during the continued travel of the stripper head and thus reverses the direction of the rotation of the brushes so that the end of the cuff of the glove (or the end of the mouth of the bag) is moved upwardly between the spade and its accompanying brush to provide a secure grip of the top open end of the glove or bag as seen, for example, in FIGS. 10 and 11.

The above gripping operation occurred during the travel of the stripping head past the various control elements as shown in FIG. 17, including the fixed operating chain 93. It will be seen that immediately following this operation, the roller 77 on its arm 76 will engage a cam 94, which serves to again move the arms 57 and the gripping elements outwardly with respect to the mold. The glove being gripped at this time, the upper end will be stretched out with respect to the mold in four places, as seen in FIGS. 13 and 14. As the roller 77 starts up the inclined portion of the track 94, the stripping head will commence to lower with respect to the mold, so that the glove will start to be turned inside out as illustrated in FIG. 15, where further progress of the stripping operation has been performed. FIG. 16 illustrates the stripping head at a further point of its travel after the mold has been completely removed from the opening in the stripping head and the glove is about to be finally stripped from the fingers.

Subsequently, the mold will complete the turn around the drive sprockets and will be inverted to pass beneath a plate 96 (FIGS. 18 and 19), and this plate 96 carries an L-shaped bracket 98 having a pin 97 secured thereon. The ends of the pin 97 pivotally carry a pair of collars 98 to which a pair of angle arms 99 are suitably secured by means of welding. The ends of these arms 99 project beyond the plate 96 and carry a support plate 103 for a chain 104, having one end yieldably connected to the plate 103 by a spring 106, as seen in FIG. 20. An angle-shaped arm 105 is secured to the plate 103 centrally thereof and projects through a hole in the bracket plate 96 and is normally disposed in flush engagement with a surface of the L-shaped bracket 98. To yieldably maintain this position of the arm 105, a pin 101 is secured in the bracket 98 and projects through an aperture in a flange of the angle-shaped arm 105. A compression spring 102 is interposed between the flange of the arm 105 and a suitable stop nut assembly on the pin 101 to hold the arm 105, the plate 103 and the chain 104 yieldably in their operative position.

The chain is positioned to engage a sprocket 73a of each stripper head to reverse its rotation so that the edge of the glove gripped between the brushes 81 and the spade 82 will be released, and the glove will be dropped for subsequent disposal. The chains 92 and 93 are mounted on plates in the same manner as the chain 101 and may be similarly spring-held to reduce shock and prevent breakage if the sprocket tooth does not enter cleanly in an opening in the chain.

While we have shown and described certain preferred methods and apparatus for performing the invention, it is apparent that the invention is capable of modification and variation from the form shown, so the scope thereof should be limited only by the scope of the claims appended hereto.

We claim:

1. In a molding apparatus, an endless conveyor having a series of spaced-apart molds supported thereon, means for driving said conveyor, an endless series of mold stripping heads having respective spaced-apart stripping stations corresponding to the spacing apart of said molds, said series of stripping heads having a stretch extending along and registering with said molds and said stations for a portion of their path of travel, each said stripping head including means for gripping an article on a mold whereby relative movement between a head and a mold results in stripping the article from the mold while turning it inside out, means for driving said heads synchronously with said molds, and means for operating each of said heads to cause said gripping means to first grip an article and then strip the article from the associated mold while in registry therewith.

2. In a molding apparatus as recited in claim 1 in which each of said gripping means includes rotatable means engageable with an article on a mold to effect rolling of the open end of the article into a cuff, and means for driving said rotatable means in either direction, whereby said open end of said article can be rolled away from a position on said mold and then can be rolled back to said position on said mold.

3. In a molding apparatus as recited in claim 1 in which each of said heads includes a plurality of pivotally mounted stripping arms carrying said gripping means and disposed about an opening in said head, and means connecting said arms for simultaneous movement toward and from the central portion of said opening to be engaged and disengaged with the mold aligned therewith.

4. In a molding apparatus as recited in claim 1 in which each of said heads includes a plurality of pivotally mounted stripping arms carrying said gripping means and disposed about an opening in said head, means connecting said arms for simultaneous movement toward and from the central portion of said opening to be engaged and disengaged with the mold aligned therewith, a rotatable brush carried by each of said arms, and means for driving said brushes in either direction.

5. In a molding apparatus as recited in claim 1 in which each of said heads includes a plurality of pivotally mounted stripping arms carrying said gripping means and disposed about an opening in said head, means connecting said arms for simultaneous movement toward and from the central portion of said opening to be engaged and disengaged with the mold aligned therewith, and each said gripping means includes a pair of co-operating article-gripping elements on each arm for engaging and gripping an article on a mold aligned with said head, and means for effecting relative movement of the head longitudinally of the article so as to strip the article from the mold and to turn it inside out during the stripping operation.

6. In a molding apparatus as recited in claim 1 in which each of said heads includes a plurality of pivotally mounted stripping arms carrying said gripping means and disposed about an opening in said head, means connecting said arms for simultaneous movement toward and from the central portion of said opening to be engaged and disengaged with the mold aligned therewith, and each said gripping means includes a pair of cooperating article-gripping elements on each arm for engaging and gripping an article on a mold aligned with said head, means for effecting relative movement of the head longitudinally of the article so as to strip the article from the mold and to turn it inside out during the stripping operation, and means is provided for subsequently operating said article-gripping elements to release the article after the mold-stripping operation.

7. In a mold stripping apparatus, a stripping head having a space provided therein to receive a mold, said head including a plurality of stripping means disposed about said space and mounted for inward and outward movement with respect to a mold disposed in said space, means for moving said stripping means to a position to open said space for insertion of a mold, means for subsequently closing said stripping means, to engage a mold, each said stripping means including a pair of article gripping elements, means for operating said elements to secure in each pair of said elements a portion of the article on said mold, and means for effecting relative movement between the mold and the stripping head to strip the article from the mold by turning it inside out.

8. In a molding apparatus, an endless conveyor having a series of spaced-apart molds connected thereto, means for driving said conveyor, a first track for supporting and guiding said molds, an endless series of mold stripping heads having respective spaced-apart stripping stations corresponding to the spacing apart of said molds, each said stripping head including means for gripping an article on a mold whereby relative movement between a head and a mold results in stripping of the article from the mold while turning it inside out, said series of stripping heads having a stretch extending along and registering with said molds and said stations for a portion of their path of travel, a second track for supporting and guiding said heads along said stretch, said tracks being disposed to provide a convergence of said heads and said molds during the initial portion of travel along said stretch, and to provide a divergent relation during the last portion of said stretch, means for moving said heads synchronously with said molds, means for effecting relative movement between a mold and the associated station during a portion of said intermediate stretch in a direction transversely to the path of travel of said conveyors, and means for operating each of said heads to cause said gripping means to first grip an article and then strip the article from the associated mold while in registry therewith.

9. In a molding apparatus, an endless conveyor having a series of spaced-apart molds connected thereto, means for driving said conveyor, a first track for supporting and guiding said molds, an endless series of mold stripping heads having respective spaced-apart stripping stations corresponding to the spacing apart of said molds, each said stripping head including means for gripping an article on a mold whereby relative movement between a head and a mold result in stripping the article from the mold while turning it inside out, said series of stripping heads having a stretch extending along and registering with said molds and said stations for a portion of their path of travel, a second track for supporting and guiding said heads along said stretch, said tracks being disposed to provide a convergence of said heads and said molds during the initial portion of travel along said stretch, and to provide a divergent relation during the last portion of said stretch, means for moving said heads synchronously with said molds, and means for operating each of said heads to cause said gripping means to first grip an article and then strip the article from the associated mold while in registry therewith.

10. In a molding apparatus, as recited in claim 9, in which each of said stripping heads includes a means engageable with an article on a mold to effect rolling of the open end of the article to form a cuff, and means for driving said means in either direction, whereby the end of said article can be rolled away from position on said mold and then can be rolled back to said position on said mold.

11. A stripping head structure comprising a body having an opening in the central portion thereof and extending therethrough, a plurality of stripping arms pivotally mounted in said body and projecting into said opening so as to be in operative relation with respect to an object disposed therein, each of said stripping arms including an article-engaging spade and a rotary brush adjacent thereto, each of said brushes having a mounting shaft, and means connecting said mounting shafts for simultaneous and reversible rotation, said arms being interconnected for simultaneous pivoting movement.

12. A stripping head structure comprising a body having an opening in the central portion thereof and extending therethrough, a plurality of stripping arms pivotally mounted in said body and projecting into said opening so as to be in operative relation with respect to an object disposed therein, each of said stripping arms including an article-engaging spade and a rotary brush adjacent thereto.

13. A stripping head structure comprising a body having an opening in the central portion thereof and extending therethrough, a plurality of stripping arms pivotally mounted in said body and projecting into said opening so as to be in tangent relation with respect to a cylindrical object disposed therein, each of said stripping arms including an article-engaging spade and a rotary brush adjacent thereto, and means connecting said arms for simultaneous pivoting movement.

14. A stripping head structure comprising a body having an opening in the central portion thereof and extending therethrough, a plurality of stripping arms pivotally mounted in said body and projecting into said opening so as to be in operative relation with respect to an object disposed therein, each of said stripping arms including an article-engaging spade and a rotary element adjacent thereto, each of said elements having a mounting shaft, and means connecting said mounting shafts for simultaneous rotation.

15. In a mold stripping apparatus, a mold, a stripping head mounted in operative relation with respect to said mold, stripping means carried by said head including a pair of gripping elements, one of said elements comprising means for rolling an open end of the article along the mold to form a cuff, means for moving the other of said elements into engagement with the mold immediately adjacent said cuff, means for operating said one element to unroll the cuff to move the article back over said other element and to grip the article between said elements, and means for effecting relative movement between the mold and the stripping means to strip the article from the mold.

16. In a mold stripping apparatus, a mold, a stripping head mounted in operative relation with respect to said mold, stripping means carried by said head including a pair of stripping elements, one of said elements comprising rotatable means for rolling an open end of the article along the mold to form a cuff, means for moving the other of said elements into engagement with the mold immediately adjacent said cuff, means for operating said rotatable means to unroll a cuff to move the article back over said other element, means for then interrupting the rotation of said rotatable means whereby the article is gripped between said elements, and means for effecting relative movement between the mold and the stripping means to grip the article from the mold.

References Cited by the Examiner

UNITED STATES PATENTS

| | | | |
|---|---|---|---|
| 1,142,945 | 6/1915 | Edwards | 118—2 |
| 1,818,792 | 8/1931 | Coovert et al. | 18—2 |
| 1,872,327 | 8/1932 | Patten | 18—2 |
| 2,025,030 | 12/1935 | Ford. | |
| 2,067,641 | 1/1937 | Miller | 18—2 |
| 2,233,555 | 3/1941 | Reisinger | 18—2 |
| 2,346,485 | 4/1944 | Hahne | 18—2 |
| 2,375,093 | 5/1945 | Fenwick | 18—2 |
| 2,431,414 | 11/1947 | Morin | 264—334 |
| 2,576,375 | 11/1951 | Williams | 264—334 |
| 2,779,055 | 1/1957 | Burger | 18—2 |
| 3,007,195 | 11/1961 | Gammeter | 18—2 |

WILLIAM J. STEPHENSON, *Primary Examiner.*

ROBERT F. WHITE, *Examiner.*

R. B. MOFFITT, *Assistant Examiner.*